United States Patent Office 3,146,064
Patented Aug. 25, 1964

3,146,064
DECONTAMINATION OF URANIUM
Robert L. Moore, Richland, Wash., assignor to the United States of America as represented by the United States Atomic Energy Commission
No Drawing. Filed Aug. 29, 1952, Ser. No. 307,181
10 Claims. (Cl. 23—14.5)

The present invention is concerned with recovery of uranium and more particularly with the decontamination of uranium values in the course of recovering said values. The present invention is specifically concerned with the decontamination of uranium derived from the recovery processes of neutron-irradiated uranium and with the recovery of uranium from ores.

In the processing of neutron-irradiated slugs aqueous acid solutions are obtained which, in addition to the uranium, contain plutonium and rare earth metal values, the so-called fission products. Separation of the uranium and plutonium is often effected by extraction with an organic water-immiscible solvent whereby the uranium and plutonium are taken up by the solvent while the fission products preferentially remain in the aqueous solution.

Zirconium, one of the fission products, however, has been causing some difficulties, because it is extracted together with the uranium to a substantial degree. Thus the organic extracts as well as the aqueous raffinates remaining after extraction usually contain zirconium, and also plutonium and uranium, and it is most desirable to separate and recover these values from the various solutions obtained during the extraction processes.

Likewise, the waste solutions obtained in the extraction processes mostly still contain minor quantities of uranium together with the fission products, and it has also been tried to recover the uranium from these waste solutions.

In order to separate plutonium and uranium from each other by solvent extraction, it has been held necessary heretofore selectively to reduce the plutonium to its trivalent non-extractable state. Ferrous sulfamate has been used as the reducing agent for this purpose, and the results obtained therewith were highly satisfactory. However, ferrous sulfamate has two distinct drawbacks, namely, it is a rather expensive chemical and it is very unstable.

In the recovery of uranium from ores, solutions are frequently obtained which contain zirconium together with uranium so that the above problem of separating the two co-extractable elements exists also in this instance. Monazite sand, for instance, is one of the ores in which uranium and zirconium coincide.

It is an object of this invention to provide a process for the separation and recovery of uranium by solvent extraction from solutions containing uranium together with zirconium and/or plutonium values.

It is another object of this invention to provide a process for the separation of uranium values from plutonium values by solvent extraction without the necessity of reducing the plutonium to its trivalent state prior to extraction.

It is a further object of this invention to provide a process for reducing the extractability of plutonium and zirconium values by means of organic solvents without thereby adversely affecting the extraction of uranium values associated with said plutonium and zirconium values.

Other objects and advantages of the present invention will be apparent upon further examination of this specification.

I have discovered that both tetravalent plutonium and zirconium can be converted to a solvent-nonextractable state by complexing them with a fluoride-containing anion (hereinafter referred to as "fluo-anion"). In other words, uranium contained in mixtures comprising, in addition to uranium, tetravalent plutonium and/or zirconium values can be decontaminated with respect to these values by solvent extraction processes if to an acidic aqueous solution of the mixture a water-soluble fluoanion-containing substance is added prior to the solvent extraction. By contacting the solution then with a substantially water-immiscible organic solvent, the uranium values are taken up by said solvent, while said other metal values remain in aqueous solution.

Fluo-anion-containing compounds found suitable for complexing tetravalent plutonium and zirconium values are the following compounds listed in the descending order of their relative efficiency for this purpose: sodium fluoride (NaF), ammonium fluosilicate $(NH_4)_2SiF_6$, sodium fluosilicate $(Na_2SiF_6)$, potassium fluosilicate $(K_2SiF_6)$, or mixtures thereof.

The acidity of the aqueous solution to be treated is advantageously adjusted to between 2.0 and 7.0 M; nitric acid is preferred. Extraction of zirconium by the organic solvent increases with increasing acidity, and a better decontamination of uranium from zirconium is therefore obtained at lower acidities. The preferred acidity range is between 3.0 and 5.0 M.

The fluo-complexing agent is suitably present in concentrations of about 0.01 M for an aqueous solution 3 M in nitric acid; however, the concentration may be as high as 0.1 M. The concentration of the uranium salt may vary widely; however, from 0.1 M to 0.4 M is the preferred range for uranyl nitrate hexahydrate. Zirconium extraction decreases with an increase of the uranium concentration in the solvent.

Normally liquid organic compounds satisfactory for extracting uranium values from the above-described aqueous solutions containing complexing agents for the zirconium values and tetravalent plutonium values pertain to the following classes: ethers, esters, ketones, alcohols, polyethers, alkyl phosphates and alkyl sulfides which are substantially immiscible with water and aqueous solutions. In particular, the following compounds have given satisfactory results in the process of this invention:

Ethyl ether
Isopropyl ether
Butoxyethoxyethane (ethyl butyl Cellosolve)
Diethyl ether of ethylene glycol (diethyl Cellosolve)
Dibutyl ether of diethylene glycol (dibutyl Carbitol)
Dibutyl ether of tetraethylene glycol
Ethyl acetate
n-Propyl acetate
Butoxyethoxyethyl acetate (butyl Carbitol acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Ethyl sulfide
n-Propyl sulfide Methyl isobutyl ketone and alkyl phosphates, in particular tributyl phosphate, however, are the preferred solvents.

Extraction is improved by adding a salting-out agent to the aqueous solution to be processed. The preferred salting-out agents for uranium in solvent extraction of uranium with tributyl phosphate from nitric acid solutions are nitrates; the nitric acid itself also acts as a salting-out agent. Generally, the salting-out agent is advantageously a water-soluble salt which has the same anion as the salt to be extracted.

The present invention lends itself also to the separation of uranium values from organic solutions containing the uranium together with plutonium and/or zirconium values. In this case the organic solution is contacted with an aqueous solution of fluo-anion-containing substance whereby any plutonium and zirconium are complexed and extracted into the aqueous solution but the uranium is left in the organic solvent.

I have further discovered that in the aqueous solutions the fluo-complexed plutonium and/or zirconium values can be restored to their preferentially organic soluble form by the addition of an aqueous solution of mineral acid or mineral acid salt, advantageously of aluminum nitrate, in a concentration of from 1 to 3 M and preferably of about 1 M, whereby the complex formed of the plutonium and/or zirconium is decomposed. Mixtures of aluminum nitrate and alkali and/or alkaline earth nitrates are also suitable for this purpose. Thereafter the values may be again extracted by an organic solvent and further separation accomplished by repetition of the extraction with a fluo-complexing agent.

The utility of the embodiments outlined hereinbefore and considered either alone or in combination has been confirmed on both a laboratory scale and a plant scale as shown by the accompanying examples.

EXAMPLE I

A solution, derived from processing neutron-irradiated uranium, 4.55 M in $HNO_3$ and containing 93.6 g. per liter of uranium was contacted with a solvent mixture containing 15% by volume of tributyl phosphate and 85% of an inert hydrocarbon having a boiling range near that of kerosene in order to extract and separate the uranium and plutonium from the fission products. The solvent mixture had been previously washed with 1 M sodium hydroxide and water. Nitric acid of a concentration of 6 N was used as scrub solution. The aqueous waste solution, the "feed," was introduced into a 14′ high and 1″ wide extraction column which was packed with ¼″ by ¼″ Raschig rings. The flow rates of tributyl phosphate mixture and aqueous feed had a ratio of 5:2. In the solvent phase 1 mg. of uranium had a $\beta$-activity of 10 cts./min. as compared with 15,000 cts./min./mg. of uranium in the aqueous feed solution.

The solvent phase containing the uranium and plutonium was then treated in a second column of similar dimensions for the back-extraction of plutonium according to the process of this invention. The "strip" solution was an aqueous solution containing 1 g. of ammonium fluosilicate per liter and nitric acid in a concentration of 2 M. Fresh solvent mixture as used for the extraction in the first column was used as scrub solution. The flow ratio of the aqueous stream:organic feed:organic scrub was 1:5:1. The plutonium content of the uranium in the organic feed solution was reduced by the back-extraction from $6.4 \times 10^3$ cts./min./mg. of uranium to 12.5 cts./min./mg. of uranium.

EXAMPLE II

Variations in the extraction coefficients ($E_a^o$) for plutonium (organic/aqueous) were studied using aqueous tetravalent plutonium solutions 3 M in nitric acid and fluosilicate present as ammonium fluosilicate in amounts varying between 0.0001 M up to 0.5 M. The foregoing aqueous solutions were contacted at 25° C. with equal volumes of an organic solvent consisting of 15% by volume of vacuum-distilled tributyl phosphate diluted with a hydrocarbon petroleum fraction whose boiling point is in the kerosene range. The results are tabulated below.

*Table I*

| Concn. of $(NH_4)_2 SiF_6$ | | $E_a^o$ Pu(IV) | R* |
|---|---|---|---|
| (M) | (g./l.) | | |
| 0 | 0 | 4.63 | 1. |
| 0.0001 | 0.0178 | 2.42 | 1.9 |
| 0.0002 | 0.0356 | 1.36 | 3.4 |
| 0.0004 | 0.0712 | 1.05 | 4.4 |
| 0.001 | 0.178 | 0.466 | 9.9 |
| 0.003 | 0.534 | 0.234 | 20 |
| 0.01 | 1.78 | 0.134 | 35 |
| 0.03 | 5.34 | 0.0689 | 67 |
| 0.1 | 17.8 | 0.0270 | 172 |
| 0.5 | 89.0 | 0.00713 | 649 |

*$R = 4.63/E_a^o$.

EXAMPLE III

The fluosilicate does not cause any appreciable complexing of uranium values. Two parallel experiments were carried out, each using identical conditions, and an aqueous feed solution 0.060 M in uranyl nitrate hexahydrate, 0.144 M in $H_3PO_4$, 0.121 M in $H_2SO_4$, 1.77 M in $NaNO_3$, and 3.0 M in $HNO_3$; however, while in one instance the extraction was carried out with this solution as is, in the other instance 1 g. of sodium fluosilicate was added to 1 liter of the solution. After each batch extraction a sample each of aqueous and organic phase was analyzed for uranium. The results are shown in the following table.

*Table II*

EFFECT OF FLUOSILICATE ON EXTRACTION OF U (VI)

[Equal volume contactings, 25° C.—15% TBP-85% diluent (same as in previous experiment)]

| Batch Extn. No. | Absence of Fluosilicate Ions | | | 1 g./l. Sodium Fluosilicate | | |
|---|---|---|---|---|---|---|
| | Aq. UNH, g./l. | $E_a^o$ | Percent Initial UNH Remaining | Aq. UNH, g./l. | $E_a^o$ | Percent Initial UNH Remaining |
| 0 | 30 | | | 30 | | |
| 1 | 4.1 | 6.21 | 13.7 | 3.98 | 6.76 | 13.3 |
| 2 | 0.62 | 6.29 | 2.1 | 0.55 | 7.55 | 1.8 |
| 3 | 0.048 | 9.16 | 0.16 | 0.051 | 7.06 | 0.17 |
| 4 | 0.0085 | 6.59 | 0.03 | 0.0068 | 5.59 | 0.02 |
| | | ¹ 7.06 | | | ¹ 6.74 | |

¹ Average.

EXAMPLE IV

As shown by the following experimental data, the amount of organic soluble plutonium is dependent on the nitric acid concentration in the feed solution.

*Table III*

VARIATION OF FLUOSILICATE COMPLEXING WITH NITRIC ACID CONCENTRATION

[Equal phase contactings; temperature=25.0° C.—Organic: 15% vacuum distilled TBP-85% of the diluent used in Example II]

| M $HNO_3$ | $E_a^o$ | $E_a^o$ with 0.01 M Ammonium Fluosilicate Present | $R = \dfrac{E_a^o \text{ in absence of } SiF_6''}{E_a^o \text{ in presence of 0.01 M } SiF_6''}$ |
|---|---|---|---|
| 0.3 | 0.236 | 0.00072 | 328 |
| 0.6 | 0.408 | 0.00303 | 135 |
| 1.3 | 1.36 | 0.0199 | 68 |
| 3.0 | 4.63 | 0.069 | 35 |
| 5.0 | 11.5 | 0.632 | 18 |

The extraction of plutonium into the organic solvent phase appears to be substantially restricted at lower acid concentrations and in the presence of the added fluosilicate ions.

EXAMPLE V

A distribution ratio for tetravalent plutonium of 4.16 was determined after an aqueous Pu (IV)-containing solution which was 3 M in nitric acid was contacted with an organic solvent mixture consisting of 15% by volume of tributyl phosphate and 85% of carbon tetrachloride. Thereafter sodium fluoride was added to the aqueous phase in a quantity to obtain a concentration thereof of 0.01 M (the nitric acid concentration had been reduced to 2.94 M by the fluoride addition). The distribution ratio for plutonium was again determined and found to be 0.109. Then sufficient aluminum nitrate nonahydrate was added to the foregoing sodium fluoride-complexed aqueous solution to obtain a concentration of 0.092 M of the aluminum nitrate; this reduced the nitric acid concentration to 2.78 M and that of the sodium fluoride to 0.01 M. The distribution ratio for plutonium was again determined and found to be 3.20.

From the foregoing experiments it is apparent that the normally organic soluble tetravalent plutonium is complexed by the fluoride to a preferentially aqueous-extractable form and that this complex can be decomposed and the plutonium thereby restored to the organic solvent-soluble form by the addition of aluminum nitrate.

The effect of fluo-anions on the extractability is illustrated in the following example.

EXAMPLE VI

An aqueous solution 0.01 M in uranyl nitrate (obtained from neutron-irradiated uranium), and containing $3.4 \times 10^6$ cts./min./ml. of zirconium tracer was contacted for 5 minutes with an equal volume of 0.4 M tributyl phosphate in methylcyclohexane diluent. The two phases obtained were separated and each phase was analyzed for beta-activity and uranium. The results are compiled in Table IV.

Table IV

| Complexing Agent (Concn.=0.01 M) | $HNO_3$, M | Zr, Ratio, org./aq. | Factor of decrease in Zr $\beta$ Ratio | U Ratio, org./aq. |
|---|---|---|---|---|
| None | 3 | $6.7 \times 10^{-3}$ | | 4.1 |
| Do | 5 | $1.9 \times 10^{-2}$ | | 4.7 |
| Fluoride | 3 | $5.4 \times 10^{-4}$ | 12 | 3.8 |
| Do | 5 | $1.1 \times 10^{-3}$ | 17 | 4.7 |
| Fluosilicate | 3 | $4.4 \times 10^{-4}$ | 15 | 3.8 |
| Do | 5 | $7.9 \times 10^{-4}$ | 24 | 4.7 |

From the foregoing data, it is apparent that the uranium ratio is not significantly altered by the complexing agents whereas the zirconium ratio is decreased by a factor of from 12 to 24.

EXAMPLE VII

This example shows that, while normally the extraction of zirconium is substantially improved with decreasing uranium content of the organic solution (which again is dependent on that of the aqueous solution), this increase is only nominal when a complexing agent is added according to this invention. Data of comparative experiments are summarized in Table V.

Table V

EFFECT OF TBP SOLVENT URANIUM CONCENTRATION AND AQUEOUS SOLUBLE COMPLEXING AGENTS ON FISSION PRODUCT EXTRACTION

[Aqueous solution: 3 M nitric acid. Solvent: $CCl_4$, 0.4 M in TBP. Activity: 90-day-cooled slug activity. Equal volumes of aqueous solution and solvent were used for each extraction]

| Equilibrium | | Complexing Agent in Aqueous Phase | Activity Ratios (org./aq.) $Zr \times 10^4$ |
|---|---|---|---|
| Aqueous U Concn. (M) | Solvent U Concn. (M) | | |
| 0.144 | 0.162 | None | 13.0 |
| 0.0687 | 0.132 | None | 25.0 |
| 0.0175 | 0.081 | None | 67.0 |
| 0.0065 | 0.048 | None | 103.0 |
| 0.1424 | 0.1624 | 0.01 M $Na_2SiF_6$ | 2.9(?) |
| 0.070 | 0.1392 | 0.01 M $Na_2SiF_6$ | 1.6 |
| 0.0173 | 0.086 | 0.01 M $Na_2SiF_6$ | 3.0 |
| 0.0061 | 0.046 | 0.01 M $Na_2SiF_6$ | 4.2 |

The change of extractability—due to decreasing uranium content—of ruthenium, cerium and uranium was found not to be affected by the presence of a fluo-anion complexing agent.

It will be understood that this invention is not to be limited to the details given herein but that it may be modified within the scope of the appended claims.

What is claimed is:

1. A process for separating uranium values from an acidic aqueous solution containing uranium values and at least one compound selected from a metal value group consisting of zirconium values and plutonium values, which comprises adding a water-soluble salt selected from a salt group consisting of sodium fluoride, ammonium fluosilicate, sodium fluosilicate, and potassium fluosilicate to said acidic aqueous solution, contacting the resultant solution with a substantially water-immiscible liquid organic solvent and separating an organic solvent phase containing uranium values from an aqueous raffinate containing said metal values.

2. A process for recovering zirconium values from an organic solution which comprises contacting said solution with an acidic aqueous solution of a salt selected from the group consisting of sodium fluoride, ammonium fluosilicate, sodium fluosilicate and potassium fluosilicate, and separating an aqueous zirconium-containing phase from an organic raffinate.

3. A process for separating uranium values from contaminants selected from the group consisting of plutonium values and zirconium values, said values being dissolved together with uranium in an acidic aqueous solution, which comprises adding a water-soluble salt of a group consisting of sodium fluoride, ammonium fluosilicate, sodium fluosilicate, and potassium fluosilicate to said aqueous solution, contacting the solution with a substantially water-immiscible liquid organic solvent, separating an organic solvent phase containing uranium values from an aqueous raffinate containing said metal values, adding a water soluble aluminum salt to said aqueous raffinate, contacting said raffinate with a substantially water-immiscible liquid organic solvent, separating said raffinate from an organic metal values-containing solution, and recycling said organic solution for further separation.

4. A process for extracting zirconium values complexed with ions selected from the group consisting of fluoride and fluosilicate anions from an acid-containing aqueous solution comprising adding a water-soluble aluminum salt to said solution, contacting said solution with a substantially water-immiscible organic solvent, and separating an organic zirconium-containing extract phase from an aqueous raffinate.

5. The process of claim 1 wherein the concentration of the water soluble salt in the aqueous phase is from 0.01 M to 0.1 M.

6. The process of claim 1 wherein the organic solvent is an alkyl phosphate.

7. The process of claim 1 wherein the organic solvent is tributyl phosphate.

8. The process of claim 2 wherein the organic solution contains tributyl phosphate in a concentration of about 0.4 M.

9. The process of claim 2 wherein the aqueous phase is 3 M in nitric acid and 0.01 M in other salt.

10. The process of claim 3 wherein said aluminum salt is an aluminum nitrate and said acid is nitric acid.

References Cited in the file of this patent

UNITED STATES PATENTS 2,227,833    Hixson et al. _____ Jan. 7, 1941